United States Patent [19]
Nishida et al.

[11] Patent Number: 5,825,730
[45] Date of Patent: Oct. 20, 1998

[54] MASTERING MACHINE HAVING NON-REPETITIVE RUNOUT COMPENSATION

[75] Inventors: Jun Nishida, Yokohama; Nobutaka Kikuiri, Tokyo; Yuuichi Tachikawa, Yokohama, all of Japan

[73] Assignee: Kabushiki Kaisha Toshiba, Kawasaki, Japan

[21] Appl. No.: 612,576

[22] Filed: Mar. 8, 1996

[30]    Foreign Application Priority Data

| Mar. 10, 1995 | [JP] | Japan | ................................. 7-050247 |
| Nov. 6, 1995 | [JP] | Japan | ................................. 7-286910 |
| Mar. 8, 1996 | [JP] | Japan | ................................. 8-051138 |

[51] Int. Cl.$^6$ ..................................................... G11B 7/00
[52] U.S. Cl. ........................... 369/44.32; 369/52; 369/54; 369/219
[58] Field of Search .............................. 369/44.25, 44.27, 369/44.29, 44.32, 50, 52, 54, 58, 215, 219, 233; 360/77.02–77.06; 346/137

[56]    References Cited

U.S. PATENT DOCUMENTS 4,764,914  8/1988  Estes et al. ................................. 369/58
5,121,374  6/1992  Barton et al. ......................... 369/44.29

OTHER PUBLICATIONS

NSK Air Bearing Unit Catalogue, Cat. No. V1390b, 1994E–1, p. 6, 1990.

Japanese Society For Precision Engineering–58–06, '92–06–1053, "An Evaluation Method of Radial Accuracy For Ultrahigh Precision Air Spindle".

Primary Examiner—W. R. Young
Attorney, Agent, or Firm—Oblon, Spivak, McClelland, Maier & Neustadt, P.C.

[57]    ABSTRACT

A mastering machine comprises a turntable being capable of holding a master disk, a detector disposed in noncontact with the turntable for detecting repetitive runout amount of the turntable in the radial direction thereof, a non-repetitive runout amount calculator for calculating a non-repetitive runout amount in the radial direction of the turntable on the output of the detector, a projector for projecting an exposure beam to the master disk held by the turntable and a compensation unit for adjusting the position of the exposure beam projected to the master disk on the basis of a signal from the non-repetitive runout amount calculator.

14 Claims, 4 Drawing Sheets

MASTERING MACHINE HAVING NON-REPETITIVE RUNOUT COMPENSATION

BACKGROUND OF THE INVENTION

1. Field of the Invention

The present invention relates to a mastering machine, in particular to one for detecting and correcting a non-repetitive runout of a turntable.

2. Description of the Related Art

In recent years an optical disk has increasingly been a focus of attention as a recording medium for supporting an information society, as it enables recording and taking out of a great deal of information. Currently a track pitch thereof may even be lum or less and thus a highly accurate positioning technique of a nanometer order is necessary for a mastering machine.

In a conventional mastering machine, a turntable is supported by a static pressure bearing and turned by means of a spindle motor. A rotary encoder is connected to the spindle motor and a signal having a rotation angle measured by means of the rotary encoder for each rotation of the turntable is sent to a spindle controller. The spindle controller sends a new signal for a rotation of the spindle motor and controls each rotation thereof. In an adjuster for adjusting a projection position of an exposure beam to the master optical disk on an exposure optical axis, movement and rotation of the turntable connected to, for instance an objective lens, and movable in a facial direction of the master optical disk are synchronized with each other and controlled by PLL control (Phase-Locked Loop control). Also, by means of an electrostatic capacitive type displacement meter, an amount of runout in a radial direction of the turntable which includes a repetitive runout and a non-repetitive runout from a side face of the turntable in the radial direction thereof is measured.

During rotation, a runout of the turntable in the radial direction thereof (master optical disk) is generated. This runout is divided into a repetitive runout with an amount determined by a position of a rotation angle of the turntable (master optical disk) and a non-repetitive runout with an irregular amount regardless of the position of the rotation angle thereof. When a repetitive runout occurs in the turntable, the center position of rotation of each track on which information is recorded is not coincident with that of the turntable. However, since the information is recorded between the tracks at a constant interval, accuracy of track pitches will never be affected. On the other hand, when a non-repetitive runout regardless of the rotation angle of the turntable (master optical disk) and irregular in amount occurs in the turntable, accuracy of track pitches will be adversely affected, making it impossible to obtain predetermined track pitches causing a tracking error. Thus, when a big non-repetitive runout occurs in the turntable during exposing in the mastering machine, the master optical disk will malfunction due to irregularity produced in track pitches. It has also been impossible to determine malfunctioning of the disk until an exposing operation is finished even when a big turntable non-repetitive runout occurs during exposing adversely affecting the track pitches of the master optical disk.

In the conventional mastering machine thus constructed, it is possible to determine irregularity in the track pitches and malfunctioning of the disk by observing a surface of the master optical disk by using a SEM (Scanning Electron Microscopy) after an exposure process or reproducing information written in the master optical disk. However, all these are performed during a check process after the exposing operation is finished and thus if a big non-repetitive runout occurs during an initial period of the exposure process, the exposing work during the remaining exposure process will be useless. Furthermore, only if the track pitches are observed after the exposure process, it is unclear whether the irregularity in the track pitches has been produced due to a non-synchronization of the turntable or not, making it impossible to determine a real cause of the irregularity therein.

SUMMARY OF THE INVENTION

It is an object of the invention to provide a mastering machine capable of preventing a deterioration in track pitch accuracy of the master optical disk due to a non-repetitive runout randomly produced in a radial direction of a turntable and making track pitches very small.

According to the invention, there is provided a mastering machine comprising a turntable on which a master disk is placed, a calculator for calculating non-repetitive runout amounts in a radial direction of the turntable, a projecting unit for projecting an exposure beam to the master disk placed on the turntable, and a compensation unit for adjusting a projection position of the exposure beam projected to the master disk on the basis of a signal from the calculator.

According to the invention, there is provided a non-repetitive runout compensating machine comprising a turntable on which a disk shape object is placed, a calculator for calculating an amount of non-repetitive runout in a radial direction of the turntable to output a non-repetitive runout signal, and a device for compensating the non-repetitive runout of the turntable on the basis of the non-repetitive runout signal from the calculator.

In the present invention, the non-repetitive runout of the turntable is output simultaneously from the non-repetitive runout amount calculator. Accordingly, when the irregularity in track pitch occurs due to the non-repetitive runout, even if exposure is performed, the non-repetitive runout can be instantaneously detected and the exposure can be instantaneously interrupted. Also, even if the irregularity of the track pitch is detected after the exposure, it can be decided whether or not the irregularity is based on the non-repetitive runout. Furthermore, the adjuster compensates the non-repetitive runout so as to reduce the irregularity of the track pitch.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

DETAILED DESCRIPTION OF THE PREFERRED EMBODIMENTS

Now, the preferred embodiments of the invention will be described with reference to the accompanying drawings.

Figure 1:
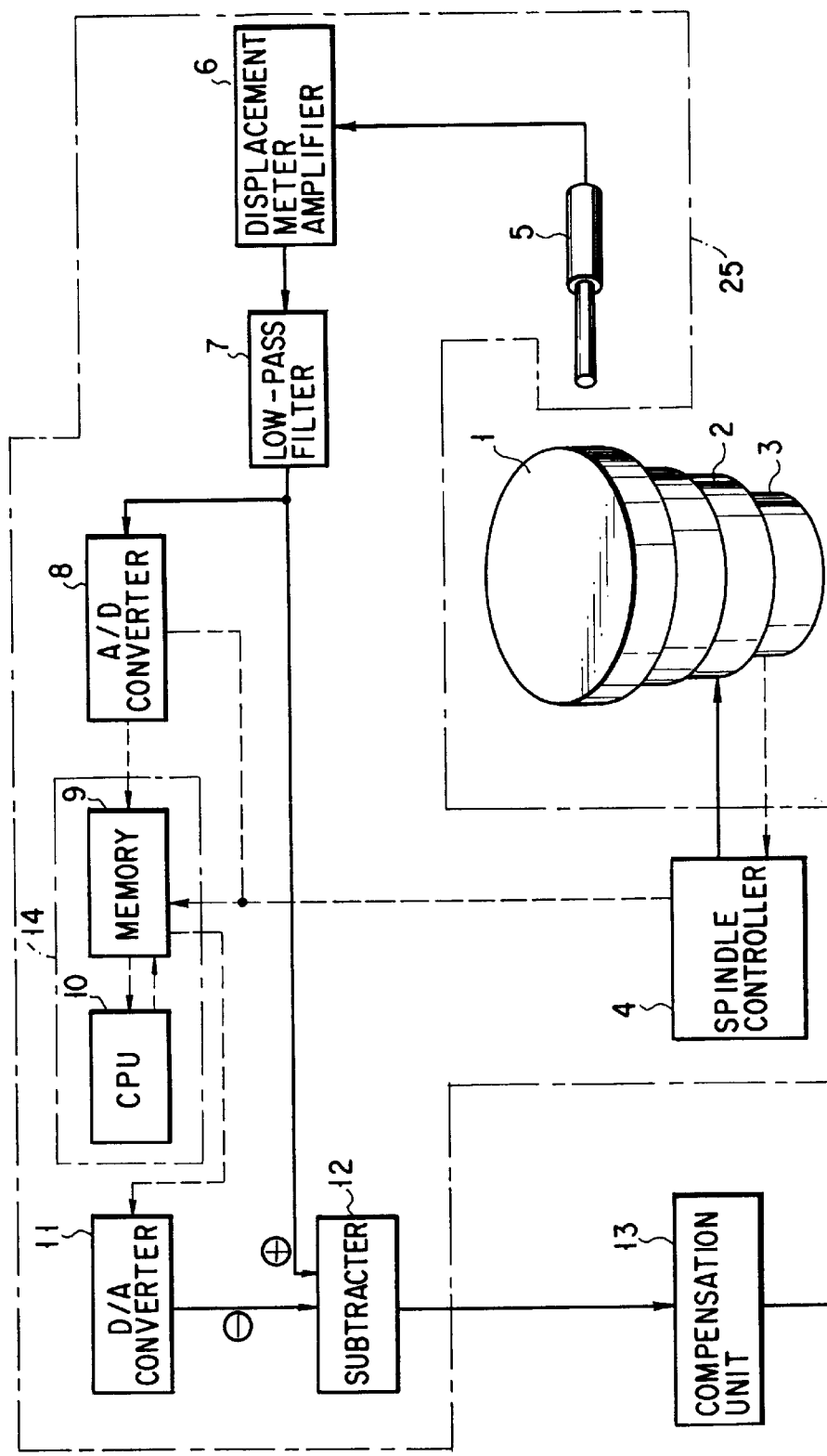
FIG. 1 is a block circuit diagram of a mastering machine of a first embodiment of the invention.

In FIG. 1, a digital signal is indicated by a broken line and an analog signal is indicated by a solid line. For example, a spindle motor 2 for rotating a turntable 1 is connected to the turntable 1 capable of holding a master optical disk. A rotary encoder 3 for detecting a rotation angle of the turntable 1 is connected to the spindle motor 2. A spindle controller 4 is electrically connected to the rotary encoder 3.

Also, an electrostatic capacitive type displacement meter 5 for measuring a rotational position in a radial direction of the turntable 1 is provided in non-contact therewith. A measured signal detected by the electrostatic capacitive type displacement meter 5 is sent to a low-pass filter 7 via a displacement meter amplifier 6. A high frequency component is cut off from the sent detected signal in the low-pass filter 7 and the signal is converted into a digital signal by an A/D converter 8. The signal converted into the digital detected signal in the A/D converter 8 is sent to a memory 9 in an arithmetic unit 14. The detected signal sent to this memory 9 can be sent to a CPU 10. From the memory 9 a signal is also output to a D/A converter 11. An A/D conversion was started by an encoder pulse derived from the spindle controller 4. A signal from the D/A converter 11 and a detected signal from the low-pass filter 7 are input to a subtracter 12. The subtracter 12 supplies its output signal to a compensation unit 13 for making an objective lens shown in FIG. 4 move in a surface direction of the turntable 1. The output signal from the subtracter 12 is sent to the compensation unit 13, so that the objective lens is moved in the surface direction of the turntable by an amount equivalent to the error.

The spindle controller 4, the electrostatic capacitive type displacement meter 5, the displacement meter amplifier 6, the low-pass filter 7, the A/D converter 8, the memory 9, the CPU 10, the D/A converter 11 and the subtracter 12 comprise a non-repetitive runout amount calculating section 25.

An operation of the mastering machine constructed as in the above will now be described.

Figure 2:
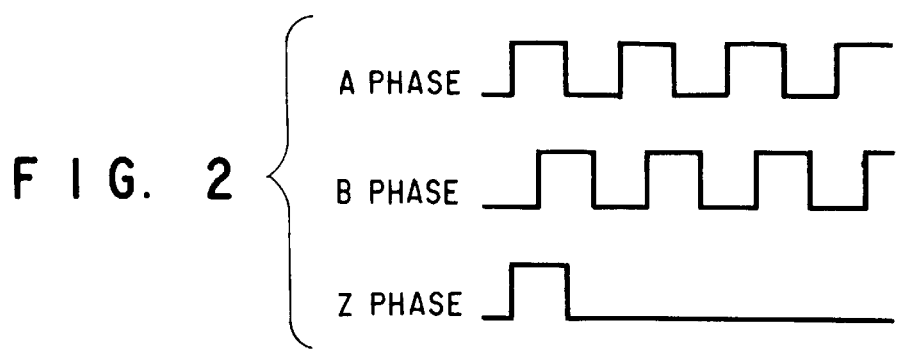
FIG. 2 is a chart showing a wave form of a pulse output from a rotary encoder.

The turntable 1 is rotated by means of the spindle motor 2 as a synchronization type AC motor. The rotary encoder 3 output signals of rotation angle of the spindle motor 2. As shown in FIG. 2, the rotary encoder 3 outputs a Z-phase signal of a pulse per one rotation and A and B-phase signals of several thousand pulses per one rotation to the spindle controller 4 for each rotation of the spindle motor 2. The A and B-phase signals are essentially the same except being different in positions for detecting the rotation angle of the spindle motor 2. A rotational position of the turntable is detected by counting the number of pulses of a Z-phase signal and an A-phase signal (or B-phase signal) output from the rotary encoder 3 in the spindle controller 4. Rotating control of the turntable 1 is performed by the spindle controller 4 via the spindle motor 2. The spindle motor 2 is controlled by PLL control.

Here, a case where a runout occurs in the radial direction of the turntable 1 (master optical disk) during one rotation thereof will be considered. The electrostatic capacitive type displacement meter 5 detects an amount of a rotary runout in the radial direction of the turntable 1 from a side face thereof. A runout in the radial direction of the turntable 1 (master optical disk) is divided into two types, a repetitive runout determined by a position of the rotation angle of the turntable 1 (master optical disk) and a non-repetitive runout randomly produced regardless of the position thereof. In order to extract only a value of this non-repetitive runout, an operation described hereinbelow is performed before the master optical disk is irradiated with the exposure beam.

Figure 3:
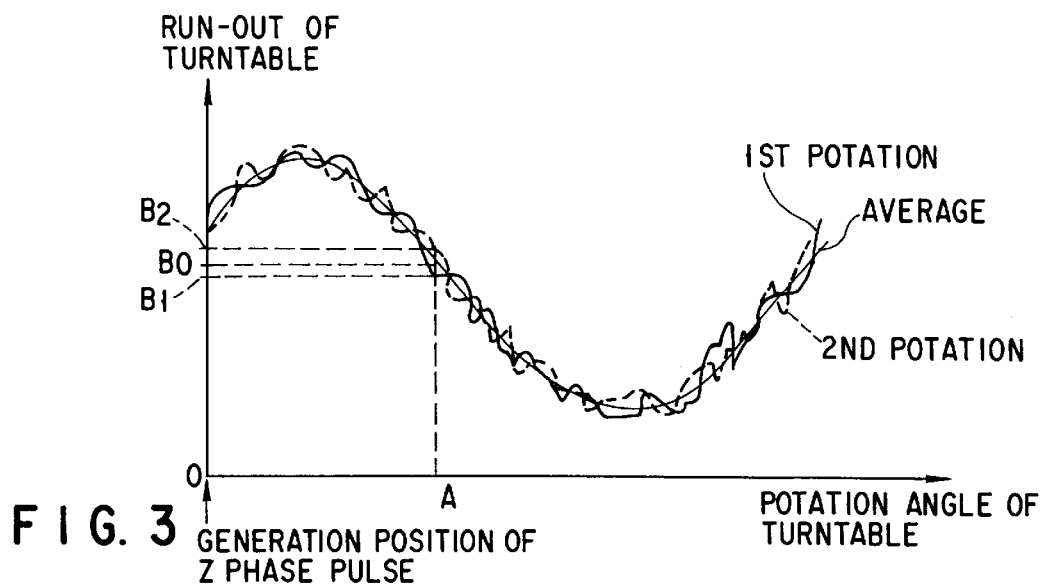
FIG. 3 is a graph showing a relationship between a rotation angle of a turntable and a runout thereof.

First, the turntable 1 makes at least two rotations (any rotations are allowed) before exposure of the master optical disk and a runout amount in the radial direction of the turntable 1 per each rotation angle thereof is detected by the electrostatic capacitive type displacement meter 5. The detected value with a high frequency component cut off by the low-pass filter 7 is converted into a digital amount by the A/D converter 8 and stored in the memory 9. An average value of runout amounts for rotation angles of the turntable 1 is obtained based on values of a stored plurality of runout amounts and the average value thus obtained is stored in the memory 9 as a repetitive runout amount for each rotation angle of the turntable 1. The average value is set, as in FIG. 3, in such a manner that, for instance, if a runout amount in the radial direction of the turntable 1 during a first rotation is B1 and a runout amount during a second rotation is B2 when the rotation angle (rotational position) of the turntable 1 is at an A point, an average runout amount (average value) B0 at this rotation angle (rotational position) is determined as (B1+B2)/2. An average value of runout amounts is determined from data on a past runout amount obtained as a result of the rotation of the turntable 1 and usually this average value is determined based on past data of, for instance ten rotations. In this case, the average value B0 is determined by (B1+B2+. . . +B10)/10 if the runout amount during the first rotation is B1, the runout amount during the second B2, . . . , the runout amount during the tenth B10.

Data on a runout amount obtained as a result of another new rotation of the turntable 1 is stored in the memory 9 as the newest runout amount data. One corresponding to the oldest of the runout amount data based on which an average repetitive runout amount values has been determined is replaced by the newest runout amount data. An average value calculated and determined by using the newest runout amount data is stored in the memory 9. This value is referred to as the runout amount average value for a next rotation. Thereafter, whenever the turntable 1 makes another rotation, a runout amount average value is renewed at each rotation angle thereof by means of the above-described method of setting the average value.

The above-described operation must be performed while the exposure process is carried out.

Next, explanation will be made of a case where the master optical disk is actually irradiated with the exposure beam.

By means of the electrostatic capacitive type displacement meter 5, a rotational runout amount in the radial direction of the turntable 1 in which both repetitive and non-repetitive runouts coexist is detected. A detected value from the electrostatic capacitive type displacement meter 5 is amplified at the displacement meter amplifier 6 and converted into a digital amount by the A/D converter 8 after passing through the low-pass filter 7. Conversion of the detected value input from the electrostatic capacitive type displacement meter 5 into the digital amount by the A/D converter 8 is performed in synchronization with a pulse from the rotary encoder 3 and thus a runout amount at each rotation angle of the turntable 1 is measured. The measured value converted into the digital amount at the A/D converter 8 is stored in the memory 9. Storage of this value in the memory 9 is performed in such a manner that based on the rotation angles of the turntable 1 determined by means of the Z-phase signal and the A-phase signal (or B-phase signal) from the rotary encoder 3, values of runout amounts respectively correspond to the rotation angles. An average value is obtained in the CPU 10, the obtained average value is sent to the memory 9 and stored therein. A runout amount detected from the turntable 1 by the electrostatic capacitive type displacement meter 5 during rotating of the turntable 1 is directly sent through the low-pass filter 7 to the subtracter 12. Meanwhile, the spindle controller 4 extracts, from detected values for the rotation angle of the turntable 1 during exposure, an average runout amount value at the rotation angle thereof from the memory 9 and sends this to the D/A converter 11 so as to convert it into an analog value. The repetitive runout value (average value) converted into the analog value at the rotation angle of the turntable 1 is sent to the subtracter 12. In the subtracter 12, a difference between the detected value of the turntable 1 and the analog average value is obtained by means of subtraction and only the analog non-repetitive runout amount of the turntable 1 is output simultaneously, making it possible to obtain the non-repetitive runout amount.

Figure 4:
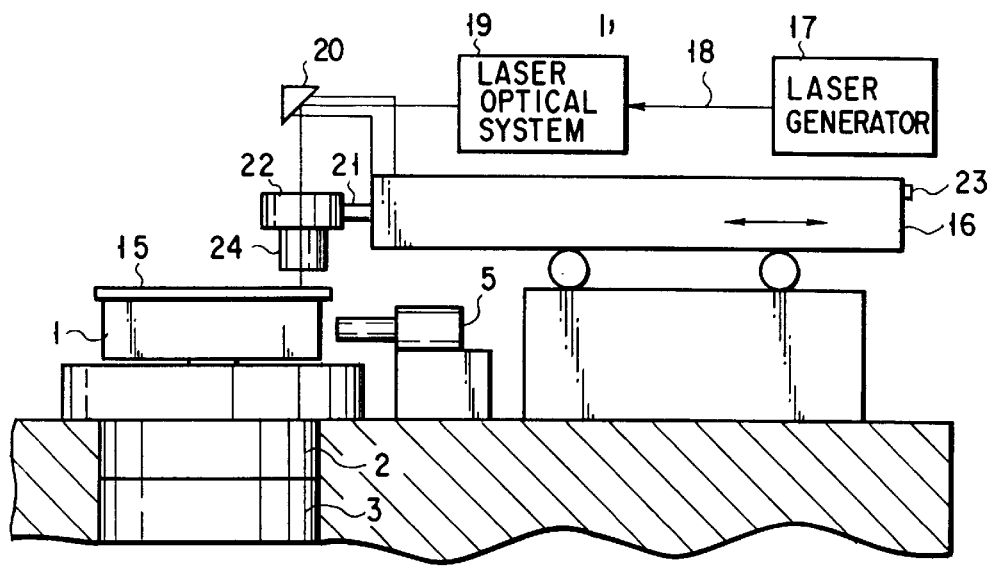
FIG. 4 is a side view of an outline of the mastering machine of the first embodiment.

An exposure operation for the master optical disk based on an output value (non-repetitive runout amount) will now be described with reference to FIG. 4.

First, explanation will be made of a structure of the mastering machine shown in FIG. 4.

A master optical disk 15 to be exposed is chucked on an air chucking mechanism on the cylindrical turntable 1 and rotated at a high speed by means of the spindle motor 2.

A slider 16 movable in a uniaxial direction is provided in the mastering machine. This slider 16 holds a laser optical system 19 for an exposure beam 18, a mirror 20, a piezoelectric element 21, a fine movement table 22 and a slider position measuring mirror 23 on the side of the slider 16 that a laser beam generator 17 is set. A position of the slider 16 is measured by irradiating the slider position measuring mirror 23 with a He-Ne laser beam. The fine movement table 22 is connected to the piezoelectric element 21, which enables the mirror 22 to move finely.

On the fine movement table 22 an objective lens 24 for condensing exposure beams is held. The position of the objective lens 24 is also measured by irradiating the objective lens position mirror with a He-Ne laser beam and a value thus measured is fed back to a system, not shown, for controlling the slider 16. As a means for sensing the position of the turntable 1 in the radial direction of the turntable 1, the electrostatic capacitive type displacement meter 5 is disposed in a side face of the turntable 1 in a noncontact state. An operation of the mastering machine thus constructed will be explained hereinbelow.

An exposure operation is performed in such a manner that the exposure beam 18 is generated from the laser beam generator 17, passing the optical system 19 on the slider 16, reflected on the mirror 20 on the slider 16 and then reaches the objective lens 24. The exposure beam 18 is condensed by the objective lens 24. Then, the exposure beam 18 is projected on the master optical disk 15 fixed on the turntable 1 provided under the objective lens 24 in noncontact and rotated by the spindle motor 2, so that the master optical disk is exposed. During the operation, a runout in the radial direction of the turntable 1 is detected by the electrostatic capacitive type displacement meter 5, measuring the position of the turntable 1. The fine movement table 22 can move in a surface direction of the turntable 1 by means of the piezoelectric element 21 and a concentrated position of the exposure beam 18 on the master disk is adjusted. The slider 16 can move in arrow direction shown in FIG. 4.

When a non-repetitive runout amount is detected, the fine movement table 22 to which the objective lens 24 is connected is moved by the same distance and in the same direction as the runout amount by means of the piezoelectric element 21 and a position of concentrated the exposure beam (position of an exposure optical axis) on the master optical disk 15 is adjusted so as to compensate the non-repetitive runout. This makes it possible to continue the exposure operation. That is, when an error signal from the subtracter 12 is input to the adjuster 13, a driver thereof converts the error signal into a driving signal and this driving signal is impressed to the piezoelectric element 21. The piezoelectric element 21 is deformed according to the error signal and moves the fine movement table 22. In this way, the exposure beam 18 is concentrated on a desired position of the master optical disk 15.

It is also possible, in the compensation unit 13 for adjusting the concentrated position of the exposure beam 18, to correct the concentrated position thereof by adjusting an incident angle of the exposure beam 18 to the mirror 20. That is, upon receiving an error signal from the subtracter 12, the adjuster 13 converts this error signal into a driving signal according to the error. By means of this driving signal, the mirror 20 is driven. For instance by supplying this signal to the motor, the mirror 20 is moved so that the exposure beam can be concentrated on a proper position of the master optical disk 15.

Furthermore, the compensation unit 13 may be the mechanism to move the spindle motor 2.

In the mastering machine constructed in the above-described manner, it is possible to output only a non-repetitive runout amount produced during rotating simultaneously during the exposure process. It is also possible to discontinue the exposure operation as soon as a non-repetitive runout of the turntable 1 entirely affecting track pitch accuracy during the process is detected.

Figure 5:
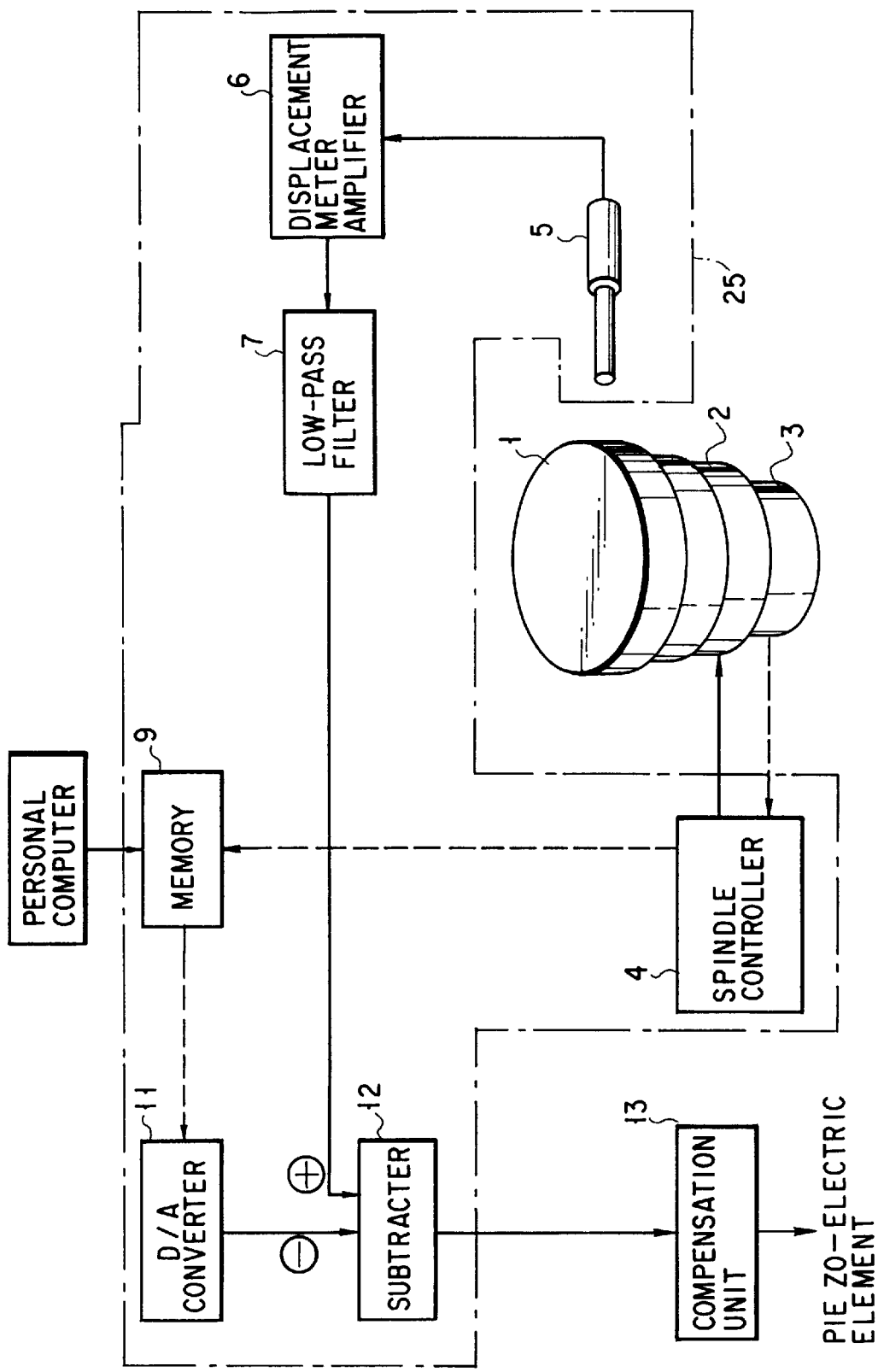
FIG. 5 is a block circuit diagram of a mastering machine of a second embodiment.

Furthermore, in a case where a deterioration in track pitch accuracy is found during inspection after the exposure operation even when no big non-repetitive runout is detected in the turntable 1 during exposing, it can be immediately determined that this is not due to the turntable 1. It is also possible to adjust the concentrated position of the exposure beam so as to prevent the track pitch accuracy becoming worse for the non-repetitive runout of the spindle motor 2. Next, explanation will be made of a structure of a mastering machine of a second embodiment by referring to FIG. 5.

In the embodiment, the same reference signs are given to the same elements as in the first embodiment and explanation thereof will be omitted. In the second embodiment, the mastering machine is characterized in that repetitive runout amounts of a turntable 1 are measured beforehand, an average value of these is calculated and stored in a memory 9 and thus an exposure operation can be performed without needing to obtain an average value prior to exposing, making an exposure operation period short.

To a turntable 1 capable of holding the master optical disk a spindle motor 2 for rotating the turntable 1 is connected. A rotary encoder 3 for detecting a rotation angle of the turntable 1 is connected to the spindle motor 2. A spindle controller 4 is electrically connected to the spindle motor 2 and the rotary encoder 3.

In noncontact with the turntable 1, an electrostatic capacitive type displacement meter 5 for detecting a runout amount in a radial direction of the turntable 1 is provided. A detected signal detected by means of the electrostatic capacitive type displacement meter 5 is sent to a low-pass filer 7 via a displacement meter amplifier 6. The detected signal with a high frequency component cut off in the low-pass filter 7 is sent to a subtracter 12.

A detected signal from the spindle controller 4 is sent to a memory 9. An average value (reference value) among repetitive runout amounts at rotation angles of the turntable 1 is calculated beforehand and a value thus obtained is stored in the memory 9. The memory 9 outputs a signal (data) of information stored in a D/A converter 11 and this signal is converted into an analog signal in the D/A converter 11. The data input to the memory 9 may be performed by a personal computer and the like.

A signal from the D/A converter 11 and a detected signal from the low-pass filter 7 are sent to the subtracter 12. The subtracter 12 outputs a signal to an adjuster 13 for making an objective lens, not shown, movable in a surface direction of the turntable 1.

A non-repetitive runout amount calculating section 25 is composed of the spindle controller 4, the electrostatic capacitive type displacement meter 5, the displacement meter amplifier 6, the low-pass filter 7, the memory 9, the D/A converter 11 and the subtracter 12.

An operation of the mastering machine thus constructed will now be described.

The turntable 1 is rotated by means of the spindle motor 2 as a synchronous type AC motor. The rotary encoder 3 detects a rotary signal of the spindle motor 2 (rotation angle of the spindle motor 2). By means of the detected rotary signal, an average value (digital signal) among repetitive runout amounts at the rotation angles of the turntable 1 stored in the memory 9 is converted into an analog signal in the D/A converter 11 and output to the subtracter 12. An average value to be set can be obtained by means of the same method as in the first embodiment.

Meanwhile, runout amounts detected from the turntable 1 by the electrostatic capacitive type displacement meter 5 during rotating thereof are directly sent through the displacement meter amplifier 6 and the low-pass filter 7 to the subtracter 12.

In the subtracter 12, a difference between the detected value of the turntable 1 and an analog average value output from the memory 9 is obtained by means of subtraction and only the analog non-repetitive runout amount of the turntable 1 is output simultaneously so as to obtain the non-repetitive runout amount.

When the exposure operation is performed by irradiating the master optical disk chucked on the turntable 1 with an exposure beam, the apparatus is under PLL control, a synchronism is taken between a movement of the adjuster 13 for adjusting the exposure beam (exposure optical axis) concentrated on the master optical disk and a rotation of the turntable 1 and a non-repetitive runout amount calculated in the adjuster 13 is corrected.

In the mastering machine thus constructed, it is possible to output only a non-repetitive runout amount produced during the exposure process simultaneously. It is also possible to discontinue the exposure operation as soon as a non-repetitive runout of the turntable 1 entirely affecting track pitch accuracy during exposing is detected.

In a case where a deterioration in track pitch accuracy is found during inspection after the exposure operation even when no big non-repetitive runout is detected in the turntable 1 during exposing, it can be immediately determined that this is not due to the turntable 1.

It is also possible, by using a value of a non-repetitive runout extracted simultaneously, to adjust a position on which the exposure beam is concentrated so as to prevent the track pitch accuracy become worse.

Furthermore, since an average repetitive runout amount value is stored in the memory 9 beforehand, it is not necessary to measure repetitive runout amounts and calculate an average value thereof before the exposure operation is started. In this system, CPU is not needed, and simple the mastering machine can be designed.

Not limited to the above-described embodiment, in order to determine an average value among runout amounts, the total number of data on past runout amounts with respect to the rotations of the turntable 1 may be optionally selected. Even if no average value among the runout amounts is detected by rotating the turntable 1, calculated and stored in the memory 9 beforehand, an average value may be obtained from runout amounts detected after the exposure operation is started.

The invention based on the above embodiments may be applied to an apparatus for compensating the non-repetitive runouts of a rotating platform such as a rotating platform mounted on a coating machine using a spin coating method, a rotating platform on which a harddisk is placed, etc.

A repetitive runout occurs not only in the turntable but also in a slider, etc., described hereinbelow. Thus, by providing a non-repetitive runout amount calculator in the slider, a non-repetitive amount in a moving part thereof is measured, making it possible to control movement thereof.

Figure 6:
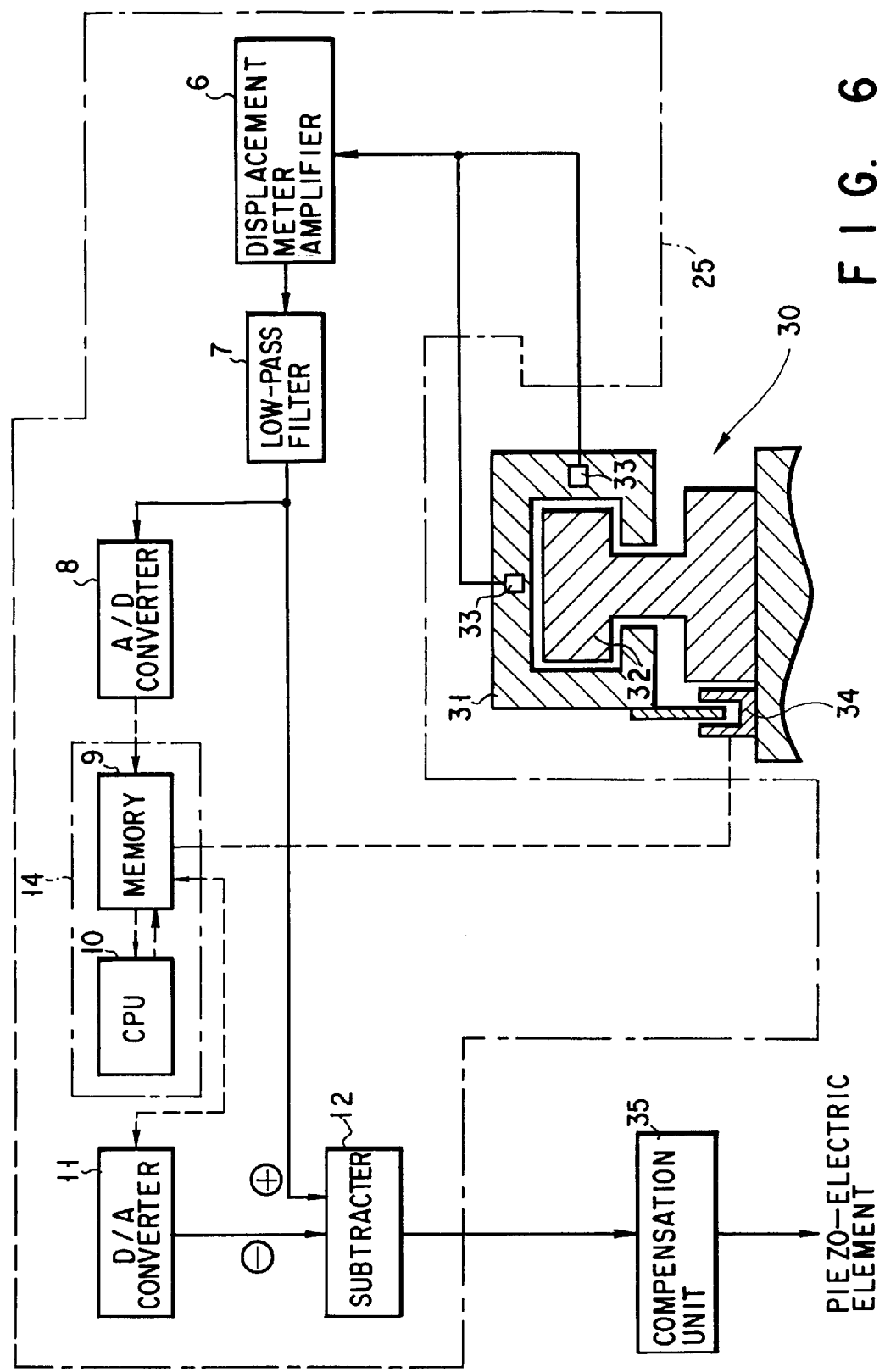
FIG. 6 is a block circuit diagram of a mastering machine of a third embodiment.

Now, explanation will be made of a structure of a slider having a non-repetitive runout amount calculator by referring to FIG. 6.

A slider 30 is composed of a slider moving part 31 and a slider fixed part 32. In the slider moving part 31, a sensor 33 for measuring a distance of a space to the slider fixed part 32. At least one sensor 33 is disposed in a direction (Y Z surface in FIG. 6) orthogonally crossing a moving direction of the slider (X axis direction in the drawing) (in the drawing two sensors 33 are disposed). The sensor 33 is connected to a displacement meter amplifier 6. In the slider moving part 31, a linear encoder 34 for detecting a moving distance of the slider 30 is also provided. The linear encoder 34 is connected to a calculating part 14. A compensation unit 35 connected to a subtracter 12 is an actuator capable of finely adjusting, for instance the slider in a direction orthogonal to the moving direction thereof.

An operation of the slider thus constructed will be described.

The slider moving part 31 is moved on the slider fixed part 32 at least twice or more. When the slider moves, a distance between the slider moving part 31 and the slider fixed part 32 is measured by an optical displacement meter 33 having an optical sensor or an electrostatic capacitive type sensor. The displacement meter amplifier 6 outputs a measured signal corresponding to the distance to a lowpass filter 7 and then send it through an A/D converter 8 to the calculating part 14. The linear encoder 34 measures a moving distance (position) of the slider 30 and outputs a measuring result to the calculating part 14. In the calculating part 14, positional information from the optical sensor 33 is stored corresponding to that of the slider from the linear encoder 34, an average value (reference value) among distances between the slider moving part 31 and the slider fixed part 32 is calculated and stored. This average value is a repetitive runout amount during the movement of the slider.

The above-described process must be performed before the operation is started.

Then, when the slider 30 actually moves linearly, the signal detected by means of the optical sensor 33 is sent to the calculating part 14 and the subtracter 12, the average repetitive runout amount value stored beforehand is output to the subtracter 12 and a non-repetitive runout amount is obtained simultaneously. The adjuster 35 operates so as to eliminate the obtained non-repetitive runout amount. In this case, the adjuster 35 supplies a driving signal corresponding to the repetitive runout amount to the piezoelectric element connected to the slider moving part 31, so that the position of the slider moving part 31 is adjusted by the piezoelectric element. In this case, the adjuster 35 supplies a driving signal corresponding to the non-repetitive runout amount to the piezoelectric element connected to the slider moving part 31, so that the position of the slider moving part 31 is adjusted by the piezoelectric element.

In the slider thus constructed, the non-repetitive runout amount in linear movement can be detected simultaneously, a moving error of the slider in linear movement can be compensated and thereby highly accurate position control can be performed.

Furthermore, the slider constructed in this way can be used for a three-dimensional measuring device. In this case, even if a non-repetitive runout due to the slider occurs in a probe measuring the shape of an object placed on the slider during measuring, by calculating the value measured by the probe and the pre-measured repetitive runout, the non-repetitive runout (error) is detected simultaneously and the measured value having no error is obtained. As a result, the accuracy of the measured value is improved.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A mastering machine comprising:
   a turntable having an upper surface on which a master disk to be recorded is placed and a side surface;
   a motor for rotating said turntable;
   a detector having a first detector portion disposed on the side surface of said rotating turntable for detecting a rotation runout of said turntable in a radial direction thereof at the side surface and outputting a first detected signal indicating the rotation runout of said turntable and a second detector portion for detecting a rotation angle of said turntable to output a second detected signal indicating the rotation angle;
   a calculator for calculating a reference repetitive runout based upon the first detected signal and a non-repetitive runout based upon the reference repetitive runout and the first detected signal;
   a projecting unit for projecting an exposure beam to record information on said master disk placed on said turntable; and
   a compensation unit for adjusting a projection position of the exposure beam projected to said master disk on the basis of the non-repetitive runout obtained by said calculator.

2. The mastering machine according to claim 1, wherein said calculator calculates an average of repetitive runout amounts at the rotation angle to obtain the reference repetitive runout.

3. The mastering machine according to claim 2, wherein said calculator includes a data storage portion for storing data on rotation runout amounts of said turntable at respective rotation angles of said turntable and calculates said average using the data stored in said data storage portion.

4. The mastering machine according to claim 2, wherein said first detector portion has a detection terminal and a capacitive displacement meter for measuring the rotation runout on the basis of variation of a capacitance between said detection terminal and said side of said turntable.

5. The mastering machine according to claim 2, wherein said second detector portion comprises a rotary encoder coupled with said turntable.

6. The mastering machine according to claim 2, wherein said calculator includes a portion configured to calculate a difference between the reference repetitive runout and the first detected signal of said first detector portion.

7. The mastering machine according to claim 1, wherein said projecting unit includes an objective lens opposite to said master disk/and said compensation unit comprises a device for moving said objective lens in a direction of a surface of said turntable in accordance with the non-repetitive runout from said calculator.

8. The mastering machine according to claim 1, wherein said projecting unit includes an objective lens opposite to said master disk/and said compensation unit comprises a device for adjusting an incident angle of the exposure beam incident to said objective lens.

9. A non-repetitive runout compensating machine comprising:
   a turntable having an upper surface on which an object having a disk shape is placed and a side surface;
   a motor for rotating the turntable;
   a detector having a first detector portion disposed on the side surface of said turntable for detecting a rotation runout of said turntable in a radial direction thereof at the side surface and outputting a first detected signal indicating the rotation runout of said turntable and a second detector portion for detecting a rotation angle of said turntable to output a second detected signal indicating the rotation angle;
   a calculator for calculating a reference repetitive runout based upon the first detected signal and a non-repetitive runout based upon the reference repetitive runout and the first detected signal; and
   a device for compensating the non-repetitive runout of said turntable on the basis of the non-repetitive runout received from said calculator.

10. The non-repetitive runout compensating machine according to claim 9, wherein said calculator calculates an average of repetitive runout amounts at the rotation angle to obtain the reference repetitive runout.

11. The non-repetitive runout compensating machine according to claim 10, wherein said calculator includes a data storage portion for storing data on rotation runout amounts of said turntable at respective rotation angles of said turntable and calculates said average using the data stored in said data storage portion.

12. The non-repetitive runout compensating machine according to claim 11, wherein said first detector portion has a detection terminal and a capacitive displacement meter for measuring the rotation runout on the basis of variation of a capacitance between said detection terminal and said side of said turntable.

13. The non-repetitive runout compensating machine according to claim 11, wherein said second detector portion comprises a rotary encoder coupled with said turntable.

14. The non-repetitive runout compensating machine according to claim 10, wherein said calculator includes a portion configured to calculate a difference between the reference repetitive runout and the first detected signal value of said first detector portion.

* * * * *